C. T. CLEAVELAND.
BREECHING FOR HORSES.

No. 175,665. Patented April 4, 1876.

Witness.
John R. Malon
W. E. Brown

Inventor
Caleb T. Cleaveland
Pr. Wm Franklin Seavey Atty.

UNITED STATES PATENT OFFICE.

CALEB T. CLEAVELAND, OF OLDTOWN, MAINE.

IMPROVEMENT IN BREECHING FOR HORSES.

Specification forming part of Letters Patent No. 175,665, dated April 4, 1876; application filed September 20, 1875.

*To all whom it may concern:*

Be it known that I, CALEB T. CLEAVELAND, of Oldtown, in the county of Penobscot and State of Maine, have invented certain new and useful Improvements in Breeching for Horses; and I do hereby declare that the following is a full, clear, and exact description thereof, that will enable others skilled in the art to which it appertains to make and use the same, reference being had to the accompanying drawings, forming a part of this specification, in which—

Figure 1:
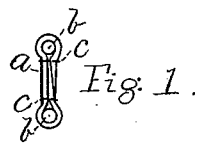
Figure 2:
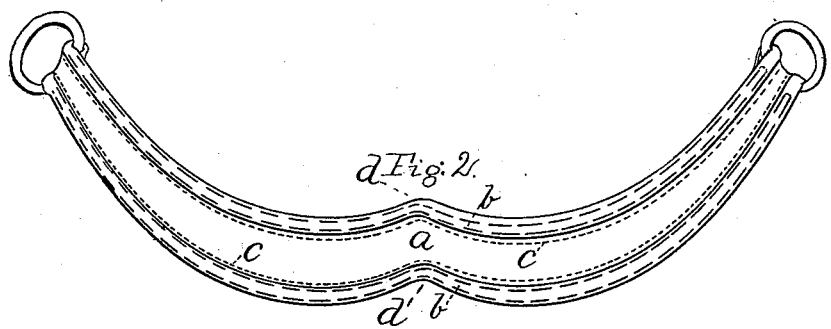

Figure 1 shows a perspective of my breeching; Fig. 2, a section of same.

Same letters show like parts.

The object of my invention is to produce an improved breeching for horses which shall enable the animal to sustain his load more easily when going down hill, and to apply power better in backing, than with the breeching now in common use. My improved breeching, instead of binding or pressing the hips of the horse together and causing him to interfere, as does the ordinary breeching, tends to force the legs apart, giving the animal a better brace and allowing the legs to work freely.

My invention consists of a spring-breeching made to conform to the shape of and fit between the hams of the horse, by inserting between the folds of the leather of, or otherwise uniting with, the ordinary breeching a steel spring or springs having a re-entrant angle, fitting between the hams of the horse, as aforesaid, and sufficiently strong to keep the ends of the breeching spread outwardly, so as to prevent its hugging around and forcing together the hips of the horse, and to bring the pressure upon the rear of the hams instead of upon the rear and sides both, as now. This spring or springs may be secured in the breeching in any convenient manner, one method being shown in Fig. 1, in which $a$ shows the breeching, and $b\,b$ the springs, (see dotted lines,) inserted at the top and bottom edge thereof, and secured by the stitches $c$. The section, Fig. 2, shows this arrangement clearly.

The formation of the springs to cause the breeching to fit between the hams of the horse and the shape which the breeching assumes are shown at $d$, Fig. 2. This form is very effectual in causing the horse to step wide, and has the advantage of keeping the breeching out of the way of the droppings of the animal, the re-entrant angle $d$ pressing with its sides upon the inside of the horse's legs, and forcing them apart when the breeching is pressed against him either in backing or going down hill.

My improved breeching may be attached to the harness, in the ordinary way, by straps $e$ and rings $f$ and the usual tackle; or it may, if desired, be attached directly to the shafts on each side, and if this method is employed the usual harness back of the saddle may be dispensed with.

What I claim as my invention, and desire to secure by Letters Patent, is—

As a new article of manufacture, a breeching formed with a central entering curve to fit the hams of the horse, and retained in shape by springs, substantially as set forth, for the purposes described.

In testimony that I claim the foregoing I have hereunto set my hand this 17th day of September, 1875.

CALEB T. CLEAVELAND.

Witnesses:
WM. FRANKLIN SEAVEY,
JOHN R. MASON.